UNITED STATES PATENT OFFICE.

HENRY CROOKES, OF LONDON, ENGLAND.

PRODUCTION OF COLLOIDAL METALS.

1,059,841. Specification of Letters Patent. Patented Apr. 22, 1913.

No Drawing. Application filed September 23, 1912. Serial No. 721,939.

*To all whom it may concern:*

Be it known that I, HENRY CROOKES, A. R. S. M., F. C. S., of 109 Ladbroke Grove, London, W., England, analytical chemist, a subject of the King of Great Britain, residing in London, England, have invented certain new and useful Improvements in or Relating to the Production of Colloidal Metals, of which the following is a specification.

This invention relates to the preparation and formation of solutions of colloids for germicidal purposes.

It has already been proposed to produce colloidal salts of silver and mercury by dissolving a suitable organic body, such as peptone, albumen, gelatin, or the like in water and adding to this solution a quantity of common salt, and then a solution of a salt of silver or mercury, and separating in the solid form the salt produced, for example by precipitation with the aid of alcohol or by evaporation to dryness. In like manner, salts of other heavy metals and particularly of iron, copper and zinc can be produced in a water soluble form. In these known processes, however, the solutions used are more concentrated than I propose to use, for instance, 1 to 3% and the product obtained is not a solution of colloidal metal, but a solid powder said to be a colloidal salt of metal.

In contra-distinction to these known methods the present invention consists in producing metal colloids by the use of very dilute solutions of the salts of metals of about one part in a thousand, that is to say one part of metal to 1000 parts of solution by weight. To effect this I mix a quantity of distilled water with a quantity of some colloidal or non-crystalloid organic body, such as peptone, gelatin, dextrin or meat extract, and to this I add a small percentage of common salt. The mixture so prepared I then boil for the purpose of proper dissolution and for adequate sterilization. I then cool the mixture and add to it in equal quantities a small amount at a time, with stirring, a very dilute solution of metallic salt of the strength indicated above.

I have found that the solution so obtained contains the metal in an extremely reduced state and in the form of a colloidal solution. For instance, to one quart of distilled water (17,500 grains) I add 300 grains of peptone and 800 grains of sodium chlorid (common salt) and boil until the peptone is completely dissolved, this solution I then allow to cool. I then filter and bring it up to its original volume with distilled water. In another quart of distilled water (17,500 grains) I dissolve 27.59 grains of nitrate of silver ($AgNO_3$), which represents 1 part per 1000 of metallic silver. This solution is then added to the former, in equal quantities, say half a pint of each at a time, and mixed thoroughly. When produced on a large scale this mixture may be allowed to stand, for say 24 hours, and is then placed in a hot air oven for about 48 hours at a temperature of about 100° F. During this time a precipitate will be formed and the supernatant clear fluorescent silver colloid liquid must be siphoned or filtered off.

For the preparation of mercury colloid a similar procedure is adopted but the proportions of the constituents are somewhat different; in one quart of distilled water (17,500 grains) I dissolve 150 grains of peptone and 800 grains of sodium chlorid (common salt). In another quart of distilled water (17,500 grains) I dissolve 24.54 grains of protonitrate of mercury $$(Hg_2(NO_3)_2, 2H_2O).$$

These two solutions are then mixed together in the same manner as described in the case of the silver salt, the resultant solution after standing, if desired for about 24 hours, is heated in the hot air oven, siphoned or filtered off and bottled, as already described.

In order to render this method absolutely efficient, it is essential, as already stated, that the metallic salt so added to the mixture should be added in a very dilute form. The salts of metals to be so used should be either the soluble salts of such metals as I have discovered to possess a strong germicidal action, viz. those of thallium, solenium, cobalt, silver, mercury, antimony or arsenic, for example, nitrate of silver, nitrate of mercury, etc., or I may use, in a similar manner and of similar strength, salts of metals which I have discovered to possess a slight germicidal action, such as bismuth, lead, nickel, iron, aluminium zinc and copper, although of course any metals having a germicidal action when in colloidal solution may be employed. By this process the metal in question is changed into what is known as the colloidal form, that is to say, it exists thenceforward in a state of molecular disaggregation, each molecule being free to move and vibrate *per se*, instead of coagulating into conglomerate particles of matter, such as a precipitate.

An alternative method of preparing the metal colloids is to boil the organic salt solution in contact with the particular metal which it is desired to transform into colloid form.

The preparation of metal colloids, in accordance with my invention, will facilitate the accurate proportioning of the metal to be used in relation to the other component substances, which is of great importance, as different bacteria require different metals and in different proportions for their extermination. Further, the preparation of the colloids in accordance with my invention will result in the formation of a colloid in which the particles of metal are extremely minute and of great symmetry and consequently insure an equal distribution of the particles of the metal throughout the whole of the fluid. Moreover, the colloids so prepared are eminently stable and are not precipitated by sodium chlorid or any electrolyte as is the case with electrically prepared colloids, or by small electric currents up to 100 milliamperes.

What I claim and desire to secure by Letters Patent is:—

1. The production of metal colloids consisting in boiling and dissolving a colloidal organic body, in distilled water with the addition of a small percentage of common salt, cooling and filtering the solution thus obtained, and then mixing therewith in equal small quantities a very dilute solution of a salt of a metal which when in the colloidal form has germicidal properties, heating the mixture to a temperature of about 100° F. and finally filtering or siphoning off the colloidal solution.

2. The production of metal colloids consisting in boiling and dissolving a colloidal organic body, in distilled water with the addition of a small percentage of common salt, cooling and filtering the solution thus obtained and then mixing therewith in equal small quantities at a time, a very dilute solution of nitrate of silver, heating the mixture to about 100° F. and finally filtering or siphoning off the colloidal solution.

In testimony whereof I have affixed my signature in presence of two witnesses.

HENRY CROOKES.

Witnesses:
CARTERET A. RÜST,
STANLEY G. S. DICKER.